United States Patent [19]

Ting

[11] Patent Number: 4,833,800
[45] Date of Patent: May 30, 1989

[54] COMBINATION SNOW BLOWER-LAWN MOWER

[76] Inventor: Ming T. Ting, 604 Epping Road, Palos Verdes Estates, Calif. 90274

[21] Appl. No.: 215,308

[22] Filed: Jul. 5, 1988

[51] Int. Cl.⁴ ............................................. E01H 5/09
[52] U.S. Cl. .......................................... 37/243; 56/263
[58] Field of Search ............. 37/242, 243; 56/DIG. 9, 56/DIG. 16, 263, 265, 264

[56] References Cited

U.S. PATENT DOCUMENTS

| | | | |
|---|---|---|---|
| 110,457 | 12/1870 | Hart | 56/263 |
| 1,537,804 | 5/1925 | Crosby | 56/263 |
| 1,858,690 | 5/1932 | Stokes | 56/263 |
| 2,364,039 | 11/1944 | Varga | 56/263 |
| 3,123,962 | 3/1964 | Hester | 37/243 |
| 3,316,696 | 5/1967 | Florido | 37/243 |
| 3,340,626 | 9/1967 | Konucik | 37/243 |
| 3,758,967 | 9/1973 | Thompson | 37/243 |
| 3,774,321 | 11/1973 | David | 37/243 |
| 4,104,812 | 8/1978 | Stribiak, Jr. | 37/243 |
| 4,597,203 | 7/1986 | Middleton | 37/242 |

*Primary Examiner*—Eugene H. Eickholt
*Attorney, Agent, or Firm*—Michael Bak-Boychuk

[57] ABSTRACT

A shearing attachment conformed for selective engagement to the lower edge of a snow blower including a set of toothed blades reciprocated relative each other. The reciprocal power may be derived from the forward motive power of the blower, conforming the blower for lawn growth cutting.

3 Claims, 2 Drawing Sheets

COMBINATION SNOW BLOWER-LAWN MOWER

BACKGROUND OF THE INVENTION

1. Field of the Invention

The present invention relates to lawn care devices, and more particularly to structures for converting snow blowers into devices for cutting grass.

2. Description of the Prior Art

Many households in the temperate zone are equipped with lawn care equipment and with snow removal devices rendered necessary by seasonal change. For functional convenience both lines of equipment are often provided with their own power source, and thus present a substantial duplication in cost and storage. Amongst these a homeowner often includes a powered snowblower and a powered mower in his equipment ensemble where the snow blower is typically provided with a double screw blade fixed for rotation adjacent a scoop over which the snow is drawn into a discharge chute. At the same time lawnmowers of the reel type advance spiral cutting blade reel across a fixed edge, severing by scissor action the growth of the lawn.

In both instances similar mechanisms are employed to power the unit, including transmission arrangements for driving the reels. Thus, substantial economics can be achieved by combining both functions in a single device.

In the past various arrangements were devised which in one way or another conform a lawn mower for snow removal use. Exemplary of such modification are the teachings of U.S. Pat. Nos. 3,774,321; 3,758,967; and 4,104,812. While suitable for the purposes intended each of the foregoing teachings contemplates conversion procedures in which removal and reattachment of machinery are required. Thus, there is some reticency in the homeowner to adopt this conversion task.

Accordingly, a simply effected conversion of a snow blower into a mowing configuration is extensively sought and it is one such conversion that is disclosed herein.

SUMMARY OF THE INVENTION

Accordingly, it is the general purpose and object of the present invention to provide a snow blower and mower in a single structure.

Other objects of the invention are to provide a conversion mechanism for a snow blower for converting the use thereof for lawn mowing.

Yet further objects of the invention are to provide a conversion mechanism for converting a snowblower for mowing grass.

Further objects of the invention are to adapt a snow blower for grass cutting and shredding.

Briefly, these and other objects are accomplished within the present invention by providing a shearing assembly to the lower front edge of the blower conformed for selective mounting and detachment. This shearing assembly may be formed as a set of elongate, toothed blades aligned over each other with the lower blade teeth projecting beyond those of the upper. The spacing of these lower teeth and their extending leading edge shape are selected to effect a particle filter by which the larger particulate matter is separated from the cutting teeth.

This assembly may be selectively mounted onto the blower to expose the power pick off on the blower side at which power take offs are provided. Thus, either a double screw blower or vaned (paddle) snow blower may be conformed for lawn use by the simple expedient of a selective attachment of the shearing assembly.

In this configuration the paddles or screw blades of the snow blower or thrower are rendered useful for collecting the sheared lawn growth into a chute or which may then direct the cut matter into a catcher mounted at the front.

DESCRIPTION OF THE PREFERRED EMBODIMENTS

Figure 1:
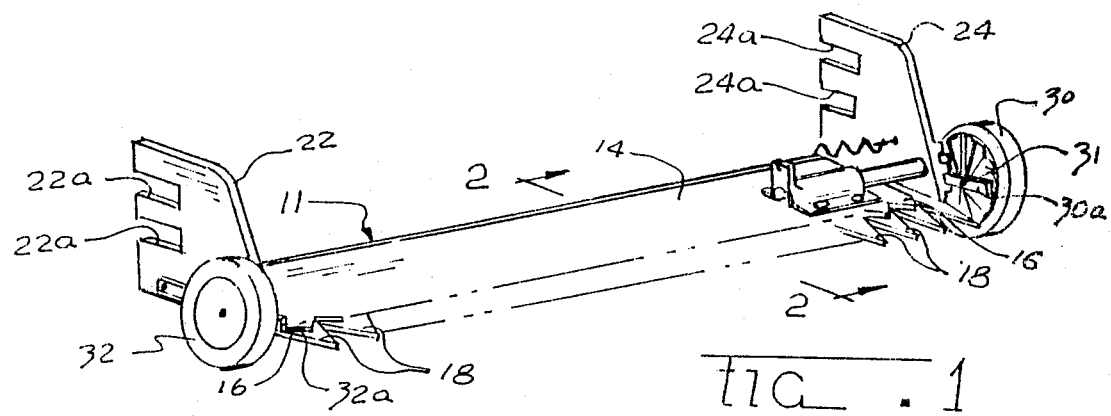
FIG. 1 is a perspective illustration of a shearing assembly constructed in accordance with the present invention.
Figure 2:
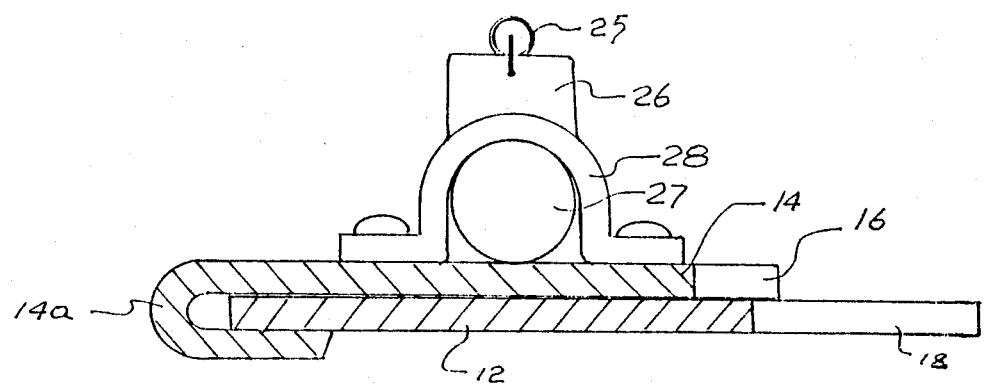
FIG. 2 is a sectional view taken along line 2—2 of FIG. 1.
Figure 3:
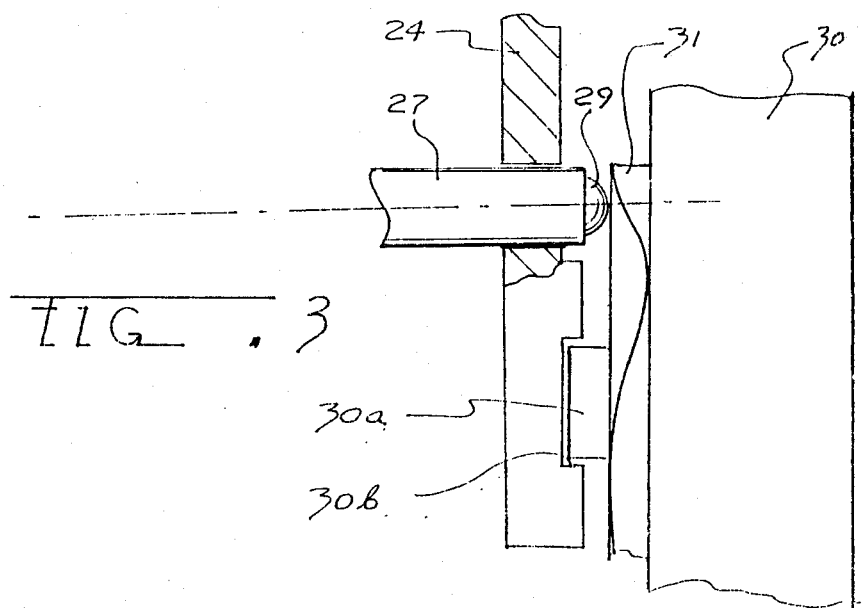
FIG. 3 is an end view detail of the assembly shown in FIG. 1.
Figure 4:
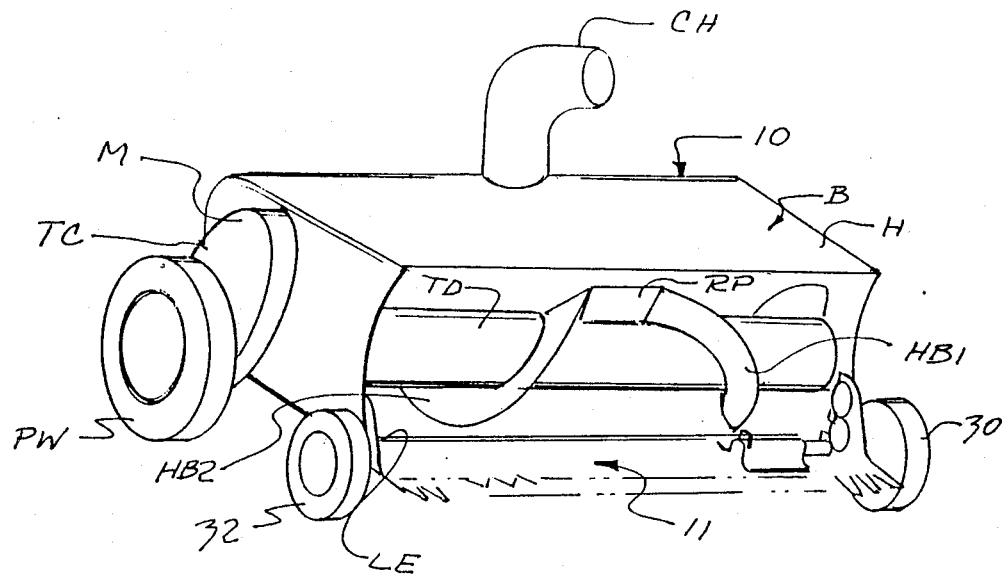
FIG. 4 is a perspective illustrative of a conventional screw implemented snow blower provided with the inventive shearing assembly.

As shown in FIGS. 1-4 the first example of the present invention, generally designated by the numeral 10, comprises a conventional snow blower B provided with a housing H open at the front to form a scoop SC defined by a lower edge LE. Extending across the interior of housing H adjacent the scoop SC is a transverse drum TD on which two opposed helical blades HB1 and HB2 are mounted. Drum TD is fixed for rotation within the housing H and thus advances the screw blades SB1 and SB2 to drive any collected matter in the scoop towards the center. A plurality of radial plates RP extend from the drum at the juncture of screws HB1 and HB2 and thus expel by centrifugal force the collected matter into the housing interior. A chute CH on the housing then directs the expelled matter to one side or another.

Typically such a snow blower assembly includes its own power source M on top of the housing which then through a transfer case TC drives the wheels PW supporting the blower and the drum TD. This same power transfer case TC can then be utilized in the manner below to conform the foregoing snow blower for lawn cutting and shredding use.

More specifically, an elongate, toothed shearing assembly 11 may be attached over and along the leading edge LE, the assembly comprising an elongate outer member 12 in which an inner member 14 is deployed for sliding. Inner member 14 includes a toothed front edge formed as a row of spaced tooth projections 16. These teeth are aligned adjacent a similar set of teeth 18 formed on the front edge of member 12, each of which extends beyond the ends of teeth 16. Thus, the teeth 18 of the lower member 12 project to a further distance and accordingly, are cut at a sharper or more acute notch angle as the notching of teeth 16. Any particulate matter that may then be lodged on the teeth 18 will be laterally moved in response to the movement of teeth 16. As result the shearing assembly 11 is effective both to cut any lawn growth and to assist in the transport of the cut matter towards the screws HB1 and HB2. The rear edge of member 14 is rolled over as a fold 14a around the rear edge of member 12. This rolled over form further assists in the transfer of the cut debris into the screws HB1 and HB2.

To effect a releasable attachment of the shearing assembly the lateral ends of the lower member 12 are provided with end tabs 22 and 24 which include slots 22a and 24a for fastener engagement to the housing H. Tab 24, moreover, is useful to engage a spring 25 stretched from a tab 26 on a clamp 28 fixed to member 14. This clamp 28 fixes a push rod along member 14 to extend, through the other tab 24 beyond the housing. At this end push rod 27 is provided with a ball roller 29 opposing a swash plate or waved surface 31 on the adjacent side of a wheel 30. Yet another wheel 32 supports the other end of assembly 11. One should note that snow blower, in conventional practice, in powered wheels PW, at the trailing edge. Wheels 30 and 32 are therefore advanced in rotation by the powered wheels PW, forming a front support for the assembly. To effect adjustment wheels 30 and 32 are each mounted on pivotal links 30a and 32a which engage selected recesses 30b on the exterior sides of the assembly 11. Thus, once implemented in accordance with the invention herein, the assembly 11 provides elevation control for the leading edge of the blower which concurrently imparts the shearing motion for cutting lawn growth.

In this form the blower B is adapted for use as a lawn mower. The cut growth is then driven into the chute in the same manner as the snow.

Figure 5:
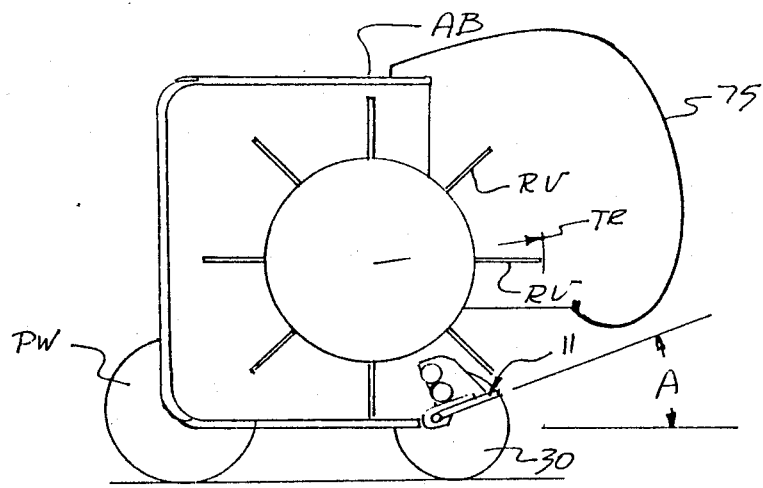
FIG. 5 is a side view, in section, of a vane snow blower including the inventive shearing assembly.

An alternative snow blower AB provided with radial vanes RV may be similarly implemented as shown in FIG. 5. In these illustrations like numbered parts operate in a like manner to that previously set out like in the previous description assembly 11 is aligned adjacent the tip radius TR of vanes RV. The alignment of the shearing assembly 11, in this instance, may be pitched up at an angle A to accumulate the cut matter for pickup.

Of course, both embodiments may be provided with a catcher bin 75 aligned over the front opening in the housing to provide the further function of a barrier shielding against inadvertent ejection of particulate matter.

Obviously many modifications and changes may be made to the foregoing description without departing from the spirit of the invention. It is therefore intended that the scope of the invention be determined solely on the claims appended hereto.

What is claimed is:

1. In a snowblower characterized by a hollow housing provided with a lower front edge and an impeller directing particulate matter on the lower edge into a chute, a power source for advancing said impeller in rotation and wheel means connected to said power source for advancing said blower over ground, the improvement comprising:

a selectively attachable shearing assembly conformed for engagement adjacent said lower edge and including a stationary toothed member, a first and second wheel adjustably secured to the lateral ends of said stationary member, an elongate reciprocal member aligned adjacent said stationary member and reciprocal power transfer means operatively connected between said wheel means and said reciprocal member.

2. Apparatus according to claim 1 wherein:

said stationary member is provided with a first plurality of teeth; and said reciprocal member is provided with a second plurality of teeth said second teeth being of a dimension smaller than said first teeth.

3. Apparatus according to claim 1 wherein:

said power transfer means includes a swash plate affixed to said first wheel, a follower attached to said reciprocal member and spring means for urging said follower against said swash plate, whereby said power applied to said wheel means reciprocates said reciprocal member by urging in rotation said first wheel and said swash plate.

* * * * *